United States Patent
Ballenger et al.

(10) Patent No.: US 6,774,612 B1
(45) Date of Patent: Aug. 10, 2004

(54) DEVICE AND METHOD FOR REDUCING DC/DC CONVERTER INITIAL SET-POINT ERROR AND MARGINING ERROR

(75) Inventors: Robert Ballenger, San Jose, CA (US); Kan Chiu Seto, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 21 days.

(21) Appl. No.: 10/273,535

(22) Filed: Oct. 18, 2002

(51) Int. Cl.$^7$ .............................. G05F 5/00; G05F 1/40
(52) U.S. Cl. ...................................... 323/303; 323/273
(58) Field of Search ................................ 323/268, 270, 323/271, 273, 275, 276, 279, 281, 282, 285, 299, 303

(56) References Cited

U.S. PATENT DOCUMENTS

| | | | |
|---|---|---|---|
| 4,933,572 A | * 6/1990 | Smith et al. | 327/548 |
| 6,118,384 A | * 9/2000 | Sheldon et al. | 340/636.15 |
| 6,147,908 A | * 11/2000 | Abugharbieh et al. | 365/185.2 |
| 6,184,720 B1 | * 2/2001 | Kim et al. | 327/37 |
| 6,437,547 B2 | * 8/2002 | Petricek et al. | 323/272 |
| 6,469,573 B2 | * 10/2002 | Kanda et al. | 327/541 |

* cited by examiner

*Primary Examiner*—Matthew V. Nguyen
(74) *Attorney, Agent, or Firm*—Thelen Reid & Priest LLP; William E. Winters

(57) ABSTRACT

An apparatus and method for significantly reducing the initial set-point error and voltage margining accuracy of a DC/DC converter. The initial set-point error is reduced by utilizing the remote sense lines of a DC/DC converter to sense the voltage from the DC/DC converter that is actually applied to the load. A power supply controller having inputs coupled to the remote sense lines compares the sensed voltage to a precision voltage reference and provides an output voltage to the TRIM input of the DC/DC converter. The apparatus and method may be implemented in a voltage supply margining test set-up to test the functionality of an electronic device while the DC/DC converter supplies a voltage to the device that is at either the upper or lower margin of an acceptable supply voltage range of the device.

37 Claims, 5 Drawing Sheets

US 6,774,612 B1

DEVICE AND METHOD FOR REDUCING DC/DC CONVERTER INITIAL SET-POINT ERROR AND MARGINING ERROR

FIELD OF THE INVENTION

The present invention relates to DC/DC converters and their use in electronic systems. More particularly, the present invention relates to reducing the initial set-point error of a DC/DC converter and expanding the margining window for electronic devices tested when powered by DC/DC converters.

BACKGROUND OF THE INVENTION

Direct current-to-direct current (DC/DC) converters are commonly used in electronic devices and systems. The principal function of a DC/DC converter is to translate a readily available voltage source to an output voltage required by a specific load. For example, in a communications application, a telephone central office battery supply voltage of 48 volts may be converted to 3.3 volts for powering a conventional integrated circuit.

FIG. 1 shows a common DC/DC converter 10 that translates a DC input voltage VIN into a DC output voltage VOUT, which has a voltage level that is less than the voltage level of the input voltage VIN. This type of DC/DC converter is commonly referred to in the art as a "buck" converter. The DC input voltage VIN supplied to buck converter 10 is periodically coupled to an inductor 102 and a diode 104, by operation of a switching transistor 100. Inductor 102 is also connected to a capacitor 106 and a load 108. Switching transistor 100 is controlled by a pulse width modulator (PWM) 110, which provides an alternating control signal to the gate of switching transistor 100. This alternating control signal alternately turns switching transistor 100 on and off, thereby alternately coupling and decoupling the input voltage VIN to and from converter 10.

When switching transistor 100 is turned on by the alternating control signal, current from the source of input voltage VIN is directed toward inductor 102 and diode 104. Due to the orientation of diode 104, however, the current is blocked from passing to ground and, instead, flows and increases linearly through inductor 102 to charge capacitor 106 and power load 108. When transistor switch 100 is turned off by the alternating control signal, VIN is decoupled from inductor 102 and diode 104. However, the current through inductor 102 continues to flow, since current through an inductor cannot decrease instantaneously to zero. Because of the decoupling of VIN from the converter, however, the inductor current does decrease, albeit at a linear fashion, flowing through the loop formed by inductor 102, the parallel combination of capacitor 106 and load 108, and diode 104. The alternate coupling of VIN to and from converter 10 results in an inductor current that is triangular in shape. The triangular-shaped inductor current is filtered by the combination of inductor 102 and capacitor 106 to remove the triangular shape and thereby provide the intended flat DC output voltage VOUT.

As might be expected, the voltage level of DC output voltage VOUT depends on how long switching transistor 100 is turned on compared to how long it is turned off. In fact, it can be shown that the average voltage level of VOUT for a converter, like the one shown in FIG. 1, is directly proportional to the duty cycle of the alternating control signal, which controls the on/off time of switching transistor 100. (The duty cycle D of a periodic waveform is the fraction of the period of the waveform during which the waveform is high.)

The voltage level of DC output voltage VOUT is dynamically monitored and adjusted in the converter 10 to encourage the voltage level of DC output voltage VOUT to be constant over time. As shown in FIG. 1, this is typically carried out by coupling VOUT to an error amplifier 112, via a voltage divider comprising a first resistor 114 and a second resistor 116, and comparing it to a reference voltage VREF. Accordingly, when the voltage at node 118 falls below VREF, indicating that VOUT is too low, error amplifier 112 provides an error signal to PWM 110 causing PWM 110 to increase the duty cycle D of the alternating control signal. On the other hand, when the voltage at node 118 rises above VREF, indicating that VOUT is too high, error amplifier 112 provides an error signal to PWM 110 causing PWM 110 to decrease the duty cycle D of the alternating control signal.

Ideally, the buck converter 10 in FIG. 1 provides an output voltage VOUT that is immune to changes in load conditions, has no AC component and maintains a constant DC level over time. In practice, however, a DC/DC converter does not provide these desirable attributes, as various internal and external factors affect the accuracy of the output. Performance limitations attributable to these factors are often characterized and published in a data sheet accompanying the converter. One of these performance limitations is characterized and expressed as the error in the "initial set-point". The initial set-point is the intended or designed output voltage level of a given DC/DC converter design under specified load conditions. The actual output voltage level may, and often does, differ from the initial set-point, due to inaccuracies of components used to build the converter. In particular, in the DC/DC converter 10 shown in FIG. 1, the voltage divider formed by resistors 114 and 116 provides a divided voltage that differs from an intended voltage due to inaccuracies in the resistances of the resistors forming the voltage divider. Additionally, in the same design, the actual output voltage level of one converter often differs from the actual output voltage of another due to deviations in intended resistance values of the resistors used in one converter compared to the next. Other factors that contribute to the initial set-point error include variations in the reference voltage VREF, the inability of error amplifier 112 to maintain its intended output voltage under different input voltages (line regulation) and output currents (load regulation). The guaranteed maximum range of variation between the intended output voltage and the initial set-point is normally published in an accompanying data sheet and is referred to as the "initial set-point error." A typical initial set-point error is +/−2–3%.

DC/DC converters are often employed to supply power to a system comprised of integrated circuits and other electrical and electronic components. A system is designed so that it is guaranteed to function properly when powered within a tolerable supply range defined by upper and lower supply limits (or "margins"). To ensure that the system does in fact function properly within the tolerable supply range, "margining" tests are typically performed to test the functionality of components of the system when powered at these supply range margins. The margining tests allow a tester to isolate and screen out those components that malfunction when the system is powered at the supply margins.

A typical margining test set-up 20 for performing margining tests is shown in FIG. 2. A tester 200, as controlled by a workstation 202, is programmed to provide test input vectors 204 to a device under test (DUT) 206, which is assumed here to be a digital device (e.g. an ASIC) for purposes of example. Test input vectors 204 typically comprise a predetermined pattern of digital bits, which are sent to DUT 206. DUT 206 operates on test input vectors 204 and provides one or more test result vectors 208. Tester 200 is configured to receive test result vectors 208 from DUT 206 and compare them to a set of expected results. A DC/DC converter 210, which supplies power to test set-up 20, includes an output terminal VOUT, which supplies a DC output voltage, a ground terminal GND, which is coupled to ground, and a trim input TRIM. As shown in FIG. 2, testing the functionality of DUT 206 at the supply margins is typically performed by coupling a first end of a trim resistor 212, having a resistance value specified by the converter data sheet, to trim input TRIM and coupling a second end of trim resistor 212 alternately, between the GND and VOUT terminals of the converter. Tester 200 provides a control signal to a switch 214, which switches the second end of trim resistor 212 to either the GND or VOUT terminals.

An electronic component of a given system is usually designed to function properly when powered within a specific design range. So, ideally, the margins of the supply voltages supplied to the component by a converter during the margining tests would match these limits. Unfortunately, due to the initial set-point error of a converter (describe above), the margining window must be reduced to take the uncertainty in supply voltage into account. For example, even though a supply range of +/−5% for a given system component may be specified as being acceptable, the supply margins of a converter supplying power to the component during the margining tests may have to be set to +/−3%, in order to take into account the initial set-point error of the converter. Having to factor in the initial set-point error is undesirable since it does not ensure that components are margin tested at the true margins of their acceptable supply ranges. This is problematic as it can lead to the passing of marginal components that would otherwise fail if tested while powered at the true margins.

The initial set-point error of a DC/DC converter becomes even more problematic as the tolerance of the supply voltages of load devices is reduced. A few years ago, integrated circuits powered by a 3.3-volt supply were common. However, as transistor dimensions have been shrunk, integrated circuit designs requiring supply voltages of only 1.2-volts have become common. The lower supply designs have led to a reduction in the tolerance of supply voltage levels. For example, whereas a 3.3-volt device may be specified to tolerate variations in supply voltage of +/−5%, a 1.2-volt device may be specified to tolerate only a +/−3% variation in supply voltage. Consequently, as systems are designed to be powered by lower supply voltages, the initial set-point error of a DC/DC converter becomes even more of a concern.

A 3.3-volt device and a 1.2-volt device may also be specified to have the same voltage supply-tolerance percentage, e.g. +/−5%. The initial set-point error of a 3.3-volt device and a 1.2-volt device may also be the same, say +/−2.5%. A +/−2.5% initial set-point error leaves a remaining +/−2.5% to cover other variables such as voltage drops on the printed circuit board upon which the device is mounted, noise and ripple, dynamic response due to load changes, etc. However, whereas this "left-over" power supply percentage (i.e. +/−2.5%) is the same for the 3.3-volt and 1.2-volt devices, the actual left-over voltage is different for the two devices. In other words, whereas +/−2.5% of 3.3 V leaves 82.5 mV of left-over voltage for the 3.3-volt device, +/−2.5% of 1.2 V leaves only 30 mV of left-over voltage for the 1.2-volt device. Hence, the initial set-point error of a DC/DC converter can also make system design more challenging, particularly for devices that operate at lower voltage levels.

In addition to the foregoing, endeavoring to maintain a DC/DC converter supply voltage within a smaller tolerance window is exacerbated by increased current demands of today's integrated circuits. State-of-the-art integrated circuits typically switch faster than older designs and, therefore, draw more current. For example, whereas a 3.3-volt integrated circuit might draw 20 A of current, a functionally equivalent 1.2-volt circuit might draw over 60 A. Larger currents make it more difficult to distribute power to the integrated circuit, since line drops between the converter and the integrated circuit are more substantial and changes in load conditions are more dramatic. Consequently, inaccuracies in the supply voltage due to increased current demands leaves even less room for acceptable error in the initial set-point of the supplying DC/DC converter.

SUMMARY OF THE INVENTION

The present invention is directed at methods and apparatus that significantly reduces the initial set-point error and improves the voltage margining accuracy of a DC/DC converter.

According to an aspect of the present invention, an apparatus for reducing the initial set-point error of a DC/DC converter comprises a DC/DC converter configured to provide a supply voltage to power terminals of a load. The converter includes a trim input for adjusting the voltage level of the supply voltage and remote sense lines coupled to power terminals of the load. A power supply controller is coupled to the remote sense lines and provides an output, which is coupled to the trim input of the converter. A voltage sensed by the remote sense lines is compared to a precision voltage reference in the power supply controller to provide an output voltage at the output of the power supply controller.

According to another aspect of the present invention, a method of reducing the initial set-point error of a DC/DC converter comprises the steps of providing a DC/DC converter configured to supply a voltage to a load, sensing a voltage actually applied to the load using sense lines of said DC/DC converter, comparing the voltage actually applied to the load to a precision voltage reference, and adjusting the voltage supplied to the load by an amount depending on the difference between the voltage actually applied to the load and the precision voltage reference.

According to another aspect of the present invention, a test set-up for performing voltage supply margining tests on a device under test (DUT) comprises a DC/DC converter configured to supply a voltage to power terminals of the DUT. The converter has a trim input and remote sense lines coupled to the DUT power terminals. A power supply controller has inputs terminals coupled to the remote sense lines and an output coupled to the trim input of the converter. Finally, a tester is coupled to the DUT and operates to compare a measured response of the DUT to an expected response. According to this exemplary embodiment, the test set-up may be configured to compare the measured response to the expected response when the voltage level of the voltage supplied to the power terminals of the DUT is approximately equal to a margin voltage of an acceptable supply voltage range of the DUT. Testing may also be performed while the voltage supplied to the DUT power terminals is within the acceptable supply voltage range of the DUT.

According to another aspect of the present invention, a method of performing voltage supply margining tests on a device under test (DUT) comprises providing a DC/DC converter configured to supply a voltage to the DUT, sensing a voltage actually applied to the DUT using sense lines of said DC/DC converter, comparing the voltage actually applied to the DUT to a precision voltage reference, adjusting the voltage supplied to the DUT by an amount depending on the difference between the sensed voltage and the precision voltage reference, and comparing a measured response of the DUT to an expected response. According to this exemplary embodiment, the power supply controller may compare the voltage sensed by the remote sense lines to the selected precision voltage reference and provide a voltage at the output of the power supply controller that causes the converter to provide a margin voltage of an acceptable supply voltage range of the DUT to the DUT.

According to another aspect of the invention, a power supply controller for reducing the initial set-point error of a DC/DC converter having remote sense lines, trim circuitry with a trim input, and power terminals for coupling to one or more electronic devices, comprises an amplifier having a first input for coupling to a signal representative of the output voltage supplied by the DC/DC converter and an output for coupling to a trim input of the DC/DC converter, and a precision voltage reference device coupled to a second input of the amplifier.

According to yet another aspect of the invention, a test set-up for performing voltage supply margining tests on a device under test (DUT) including circuitry for reducing the initial set-point error of a DC/DC converter comprises an amplifier having a first input for coupling to a signal representative of the output voltage supplied by the DC/DC converter and an output for coupling to a trim input of the DC/DC converter, a precision voltage reference for coupling to a second input of the amplifier, and a tester coupled to the DUT operable to compare a measured response of the DUT to an expected response.

Other aspects of the inventions are described and claimed below, and a further understanding of the nature and advantages of the inventions may be realized by reference to the remaining portions of the specification and the attached drawings.

DETAILED DESCRIPTION

Figure 1:
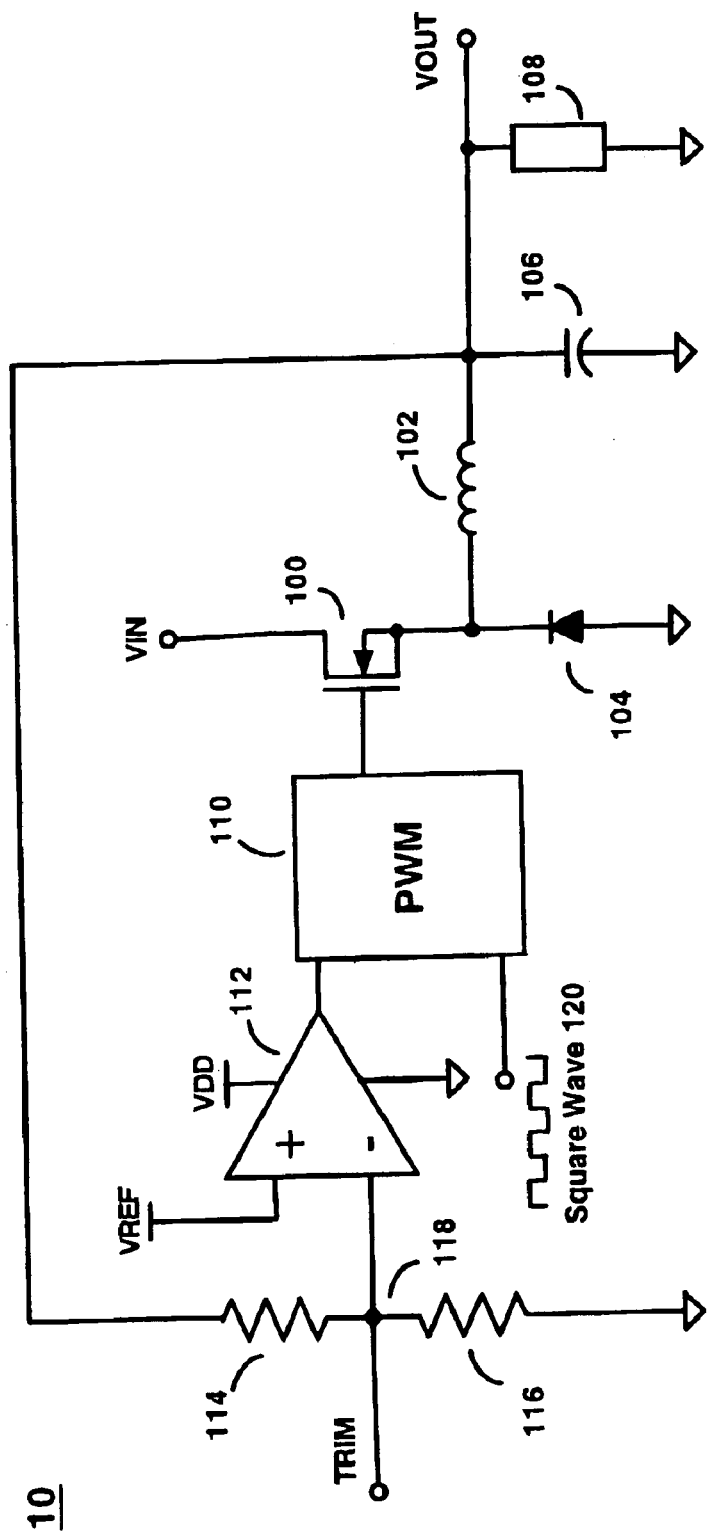
FIG. 1 shows a schematic diagram of a prior art buck converter.
Figure 2:
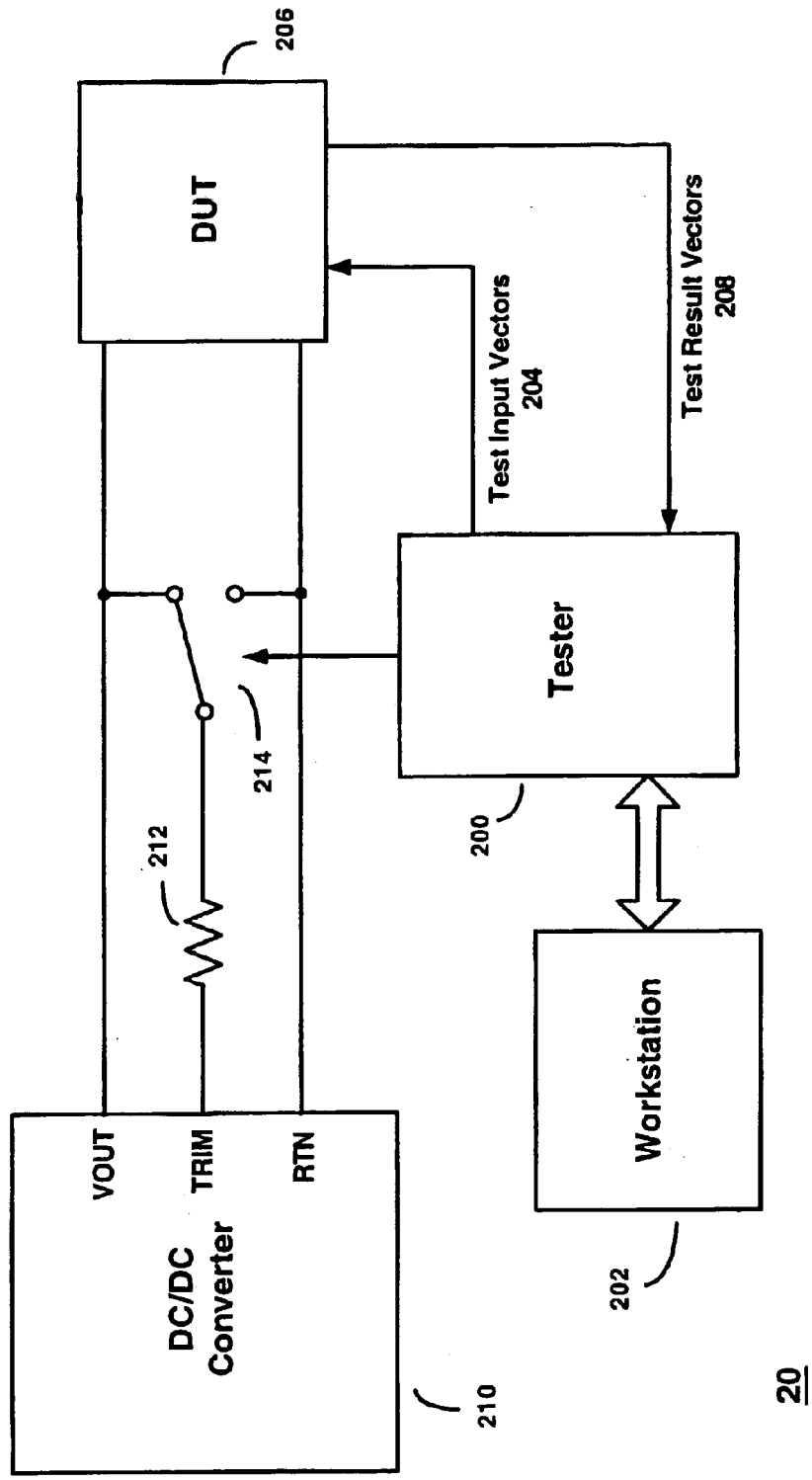
FIG. 2 shows a typical margining test set-up for performing margining of a device under test (DUT) when powered by a DC/DC converter.
Figure 3:
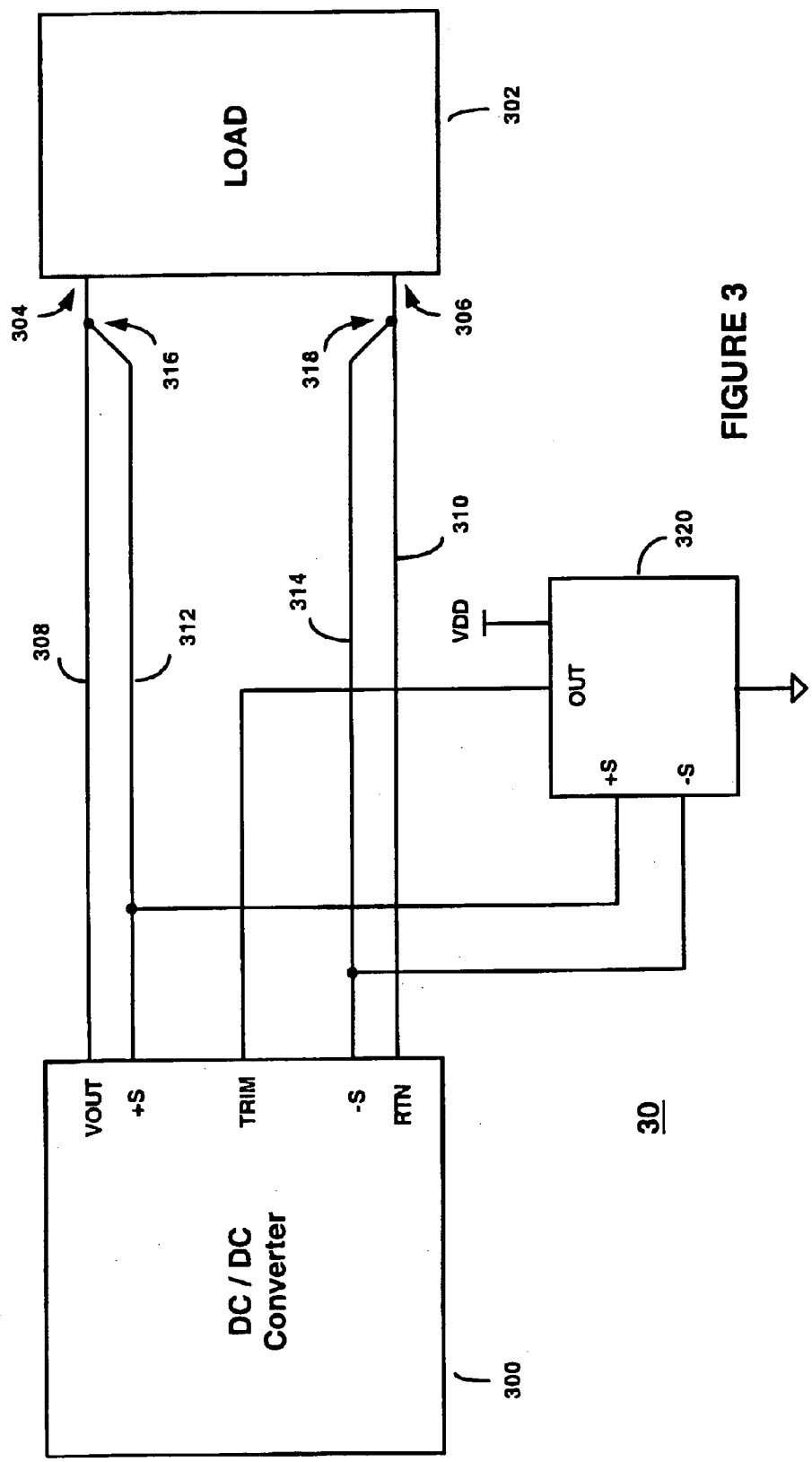
FIG. 3 shows a block diagram of system for reducing the initial set-point error of a DC/DC converter, according to an embodiment of the present invention.

Referring to FIG. 3, there is shown a block diagram of a system 30 for reducing the initial set-point error of a DC/DC converter 300, according to an embodiment of the present invention. DC/DC converter 300 operates by converting a direct current (DC) input voltage VIN into a DC output voltage VOUT. Output voltage VOUT is coupled to a load 302 at load power and return terminals 304 and 306, via power line 308 and power return line 310, respectively. Load 302 may comprise an isolated electronic component or any one of a number of electronic components assembled on a printed circuit board as part of an electronic system. DC/DC converter 300 includes sense terminals S+ and S−, which are coupled to remote sense lines 312 and 314. Remote sense lines 312 and 314 are coupled to power line 308 and power return line 310 at connection points 316 and 318, respectively.

Remote sense lines 312 and 314 "sense" the voltage supplied to load 302 at the load power and return terminals 304 and 306. Connection points 316 and 318 are made as close to load power and return terminals 304 and 306 as is practicable. This permits voltage regulation circuitry in converter 300 to regulate the power that is actually supplied to load 302, thereby compensating for voltage drops that occur across power and return lines 308 and 310. Power supply controller 320 in FIG. 3, which may be packaged separately or in the same package as the converter 300, monitors the voltage that is actually applied to load 302 and compares it to a precision voltage reference included within component 320. Based on the comparison, power supply controller 320 provides a signal to the TRIM input of DC/DC converter 300, thereby causing the output voltage of converter 300 to adjust so that the actual voltage supplied to load 302 is closer to the intended value.

Figure 4:
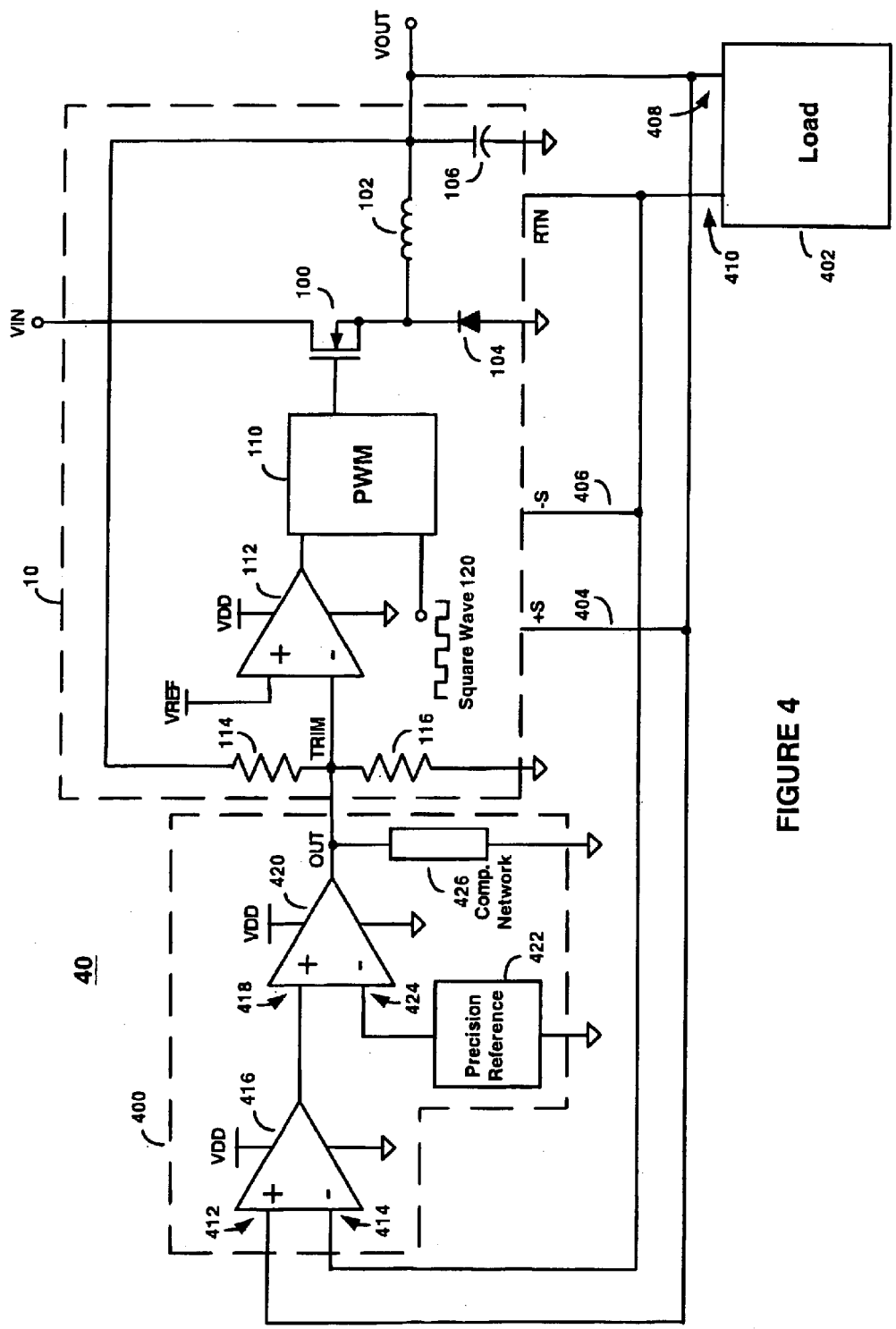
FIG. 4 shows a more detailed diagram of a system similar to the system shown in FIG. 3 for reducing the initial set-point error of a DC/DC converter, according to an embodiment of the present invention.

FIG. 4 shows a more detailed diagram of a system 40 including a power supply controller 400 for reducing the initial set-point error of a DC/DC converter 10, according to an embodiment of the present invention. DC/DC converter 10 may be of the form described above or may comprise any other type of DC/DC converter having a TRIM input and remote sense lines. Remote sense lines 404 and 406 from DC/DC converter 10 are coupled to load power and return terminals 408 and 410 of load 402. Remote sense lines 404 and 406 are also differentially coupled to the input of power supply controller 400, i.e., to the non-inverting input 412 and the inverting input 414 of operational amplifier 416. Operational amplifier 416 provides an output signal representative of the potential difference between the voltage sensed by remote sense lines 404 and 406. The output of operational amplifier 416 is coupled to the non-inverting input 418 of a second operational amplifier 420. A precision voltage reference 422 providing a voltage level reference that is very close to the intended output voltage level (for example, within +/−0.5%) is coupled to the inverting input 424 of operational amplifier 420. The output of operational amplifier 420 is coupled to the TRIM input of DC/DC converter 10. A compensation network 426 may additionally be coupled to the output of operational amplifier 418, if necessary to provide proper impedance matching and stability between the power supply controller 400 and the DC/DC converter 10. The opposing end of compensation network may be coupled to ground (as shown in FIG. 4) or to inverting input 424 of second operational amplifier 420.

Without power supply controller 400, the voltage at the TRIM node in FIG. 4 is determined by the resistor divider made up of resistors 114 and 116 and this voltage is compared to VREF of amplifier 112. As explained above, the inaccuracies of the values of resistors 114 and 116 and variations in VREF contribute to the initial set-point error. When, however, power supply controller 400 is coupled to DC/DC converter 10 as shown in FIG. 4, the voltage at the TRIM node is determined by power supply controller 400. Power supply controller 400 operates by comparing VOUT to an intended output voltage level determined by precision reference 422. As VOUT deviates from the intended output voltage level, amplifier 420 sources or sinks current as necessary to force DC/DC converter 10 to provide a VOUT that is closer to the intended output voltage level. In this manner, the inaccuracies of resistors 114 and 116 and variations in VREF are avoided and the initial set-point error is reduced.

Note that other various and obvious alterations to system 40 may be made without departing from the intended scope and spirit of the invention. For example, those skilled in the art would readily understand that the output of operational amplifier 416 may be coupled to either the non-inverting input 418 (as shown in FIG. 4) or the inverting input 424 of second operational amplifier 420 with, of course, the precision reference 422 connected to the remaining input of second operational amplifier 420.

Figure 5:
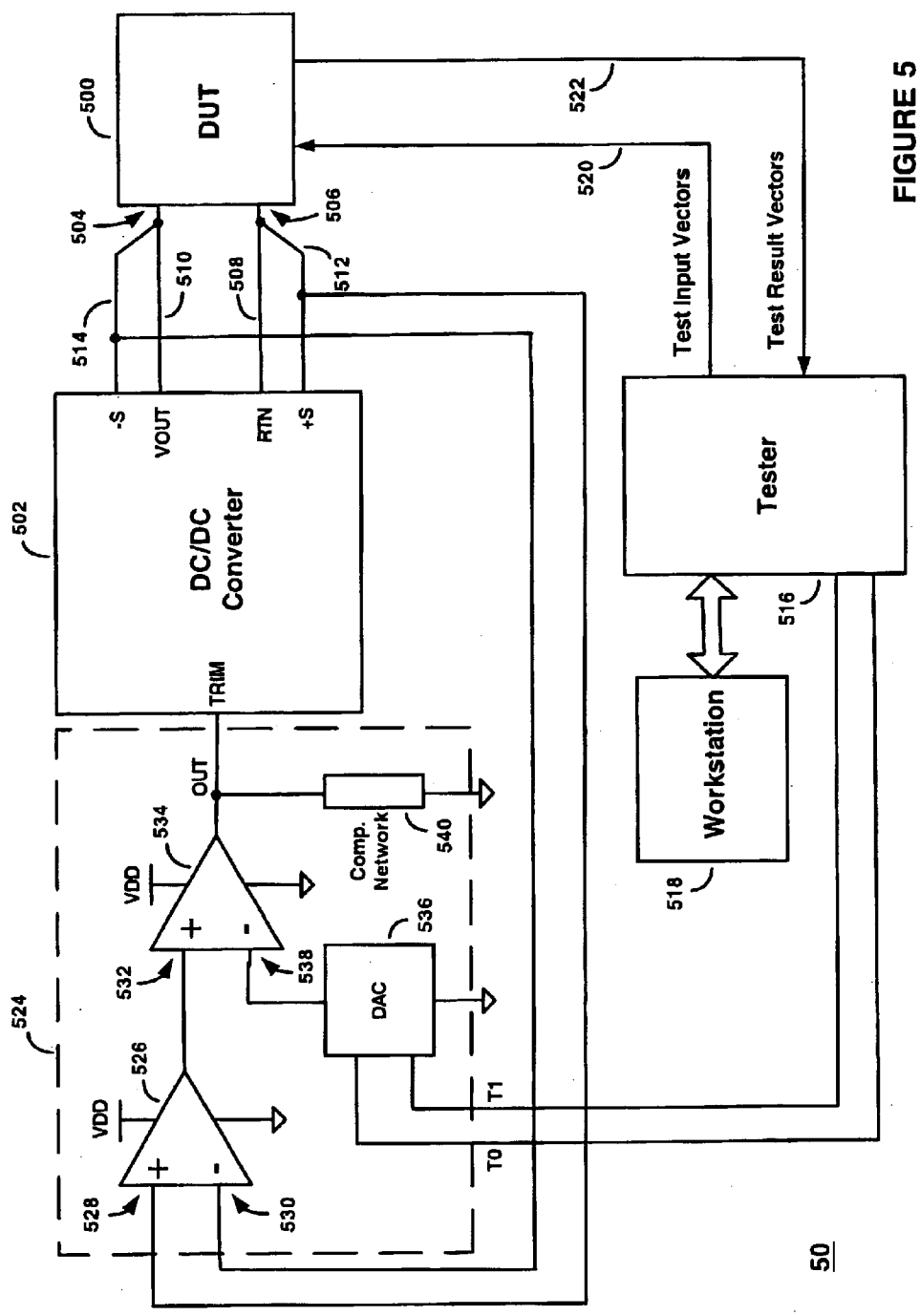
FIG. 5 shows a margining test set-up for testing a device under test (DUT), according to an embodiment of the present invention.

Referring now to FIG. 5, there is shown a margining test set-up 50 for testing a device under test (DUT) 500, according to an embodiment of the present invention. DUT 500 may comprise any electronic component such as, for example, an integrated circuit. DUT 500 is coupled to and powered by a DC/DC converter 502. DC/DC converter 502 provides a DC output voltage VOUT, which is coupled to DUT 500 at DUT power and return terminals 504 and 506 via power line 510 and power return line 508. DC/DC converter 502 also includes sense terminals S+ and S−, which are coupled to remote sense lines 512 and 514. Remote sense lines 512 and 514 are coupled to power line 510 and power return line 508 as close to DUT power and return terminals 504 and 506 as is practicable.

A tester 516, as controlled by a computer workstation 518, is programmed to provide test input vectors 520 to DUT 500. DUT 500 operates on test input vectors 520 and provides one or more test result vectors 522. Tester 516 is configured to receive test result vectors 522 from DUT 500 and compare them to a set of expected results.

A power supply controller 524, in FIG. 5, is operable to control the DC output voltage VOUT and the voltage applied to power and return terminals 504 and 506 of DUT 500. It also operates to reduce the initial set-point error of DC/DC converter 502, as was described above in relation to FIG. 4. Power supply controller 502 comprises a first operational amplifier 526 having a non-inverting input 528 coupled to remote sense line 512 and an inverting input 530 coupled to the remote sense line 514. Accordingly, in this exemplary embodiment, operational amplifier 526 provides an output signal that is proportional to the potential difference between the voltage sensed by remote sense lines 512 and 514. The output of operational amplifier 526 is coupled to the non-inverting input 532 of a second operational amplifier 534. A two-bit digital to analog converter (DAC) 536, capable of providing different precision voltage levels at its output, is coupled to the inverting input 538 of second operational amplifier 534. The output of second operational amplifier 534 is coupled to the TRIM input of DC/DC converter 502. A compensation network 540 may additionally be coupled to the output of the second operational amplifier 534, if necessary to provide proper impedance matching between power supply controller 524 and the TRIM input of DC/DC converter 502.

To test DUT 500 while powered at the upper margin of the DUT's acceptable supply voltage range, tester 516 provides a first binary control signal to the binary inputs T0, T1 of DAC 536. The first binary control signal comprises a digital pattern that signals DAC 536 to couple a first precision voltage reference to inverting input 538 of second operational amplifier 534. This first precision voltage reference is of a value that causes the second operational amplifier 534 to provide a power supply controller 524 output OUT to the TRIM input of DC/DC converter 502 and cause DC/DC converter 502 to supply a voltage that powers DUT 500 at the upper margin of its tolerable supply voltage range. The power supplied to DUT 500 is continually sensed by remote sense lines 512 and 514, fed back to power supply controller 524 and compared to the first precision voltage reference, so that DC/DC converter 502 may be trimmed to provide the intended upper margin supply voltage to DUT 500.

As DUT 500 is powered at the upper supply margin, tester 516 sends test input vectors 520 to DUT 500, which operates on the vectors and provides one or more test result vectors 522. Finally, test result vectors 522 are compared to a set of expected results to determine whether DUT 500 passed the upper margin test.

DUT 500 may also be tested while powered at the lower margin of the DUT's acceptable supply voltage range. To do this, tester 516 provides a second binary control signal to the binary inputs T0, T1 of DAC 536. The second binary control signal comprises a digital pattern that signals DAC 536 to couple a second precision voltage reference to inverting input 538 of second operational amplifier 534 to provide a power supply controller 524 output OUT to the TRIM input of DC/DC converter 502 and cause DC/DC converter 502 to supply a voltage that powers DUT 500 at the lower margin of its tolerable supply voltage range. The power supplied to DUT 500 is continually sensed by remote sense lines 512 and 514, fed back to power supply controller 524 and compared to the first precision voltage reference, so that DC/DC converter 502 may be trimmed to provide the intended lower margin supply voltage to DUT 500.

As DUT 500 is powered at the lower supply margin, tester 516 sends test input vectors 520 to DUT 500, which operates on the vectors and provides one or more test result vectors 522. Finally, test result vectors 522 are compared to a set of expected results to determine whether DUT 500 passed the lower margin test.

A tester 516 and computer workstation 518 are shown in the exemplary margining test set-up shown in FIG. 5. However, other ways of testing the DUT may be conducted and may depend on the type of DUT being tested. For example, the DUT may comprise a discrete electronic component such as a diode or transistor, in which case test vectors are not necessary to determine the component's functionality. Rather, the output characteristics (e.g. voltage level) may be simply monitored by a voltmeter, oscilloscope, or the like and compared to an expected output characteristic to determine whether the component is functioning as expected. Additionally, whereas a DAC is shown as providing the different precision voltages other types and ways of providing precision voltage references may be used.

The margining test methods described above describe a DUT being tested while powered at the margins of the DUT's acceptable power supply range. Other precision voltage references may also be selected and employed and are considered to be within the scope and spirit of the present invention. Specifically, the DUT may be tested at any voltage within the acceptable supply voltage range. For example, a precision reference voltage may be selected and employed such that DUT is powered at its preferred or nominal supply voltage. This would allow the functionality of the DUT to be checked when powered under optimal conditions. Further, whereas selection of the precision voltage reference (DAC 536 in FIG. 5) is shown as being controlled by tester 516, this is not necessary. In other words, selection and/or adjustment of the precision voltage reference may be controlled by other means. For example, manual controllable switches may be coupled to a variety of precision voltage references so that a user of test set-up 50 may manually control the selection and employment of the precision voltage references.

While the above is a complete description of specific embodiments of the present invention, various modifications, variations, and alternatives may be employed. For example, whereas a buck converter is shown and described in the embodiment shown in FIG. 4, other DC/DC converters (e.g. boost converters) having a TRIM adjust input and remote sense lines may be used. Additionally, the power supply controllers 400 and 524 shown in FIGS. 4 and 5, respectively, are not intended to be limited to the specific components and implementations shown. For example, it is not necessary that exactly two operational amplifiers be used to perform the power control function. Any controller that is operable to compare the sensed output voltage applied to the load 402 (in FIG. 4) and DUT 500 (FIG. 5) to a precision reference and provide an output to effect an appropriate change in output voltage is considered to be within the scope of the invention. Therefore, the scope of this invention should not be limited to the embodiments described, and should instead be defined by the following claims.

We claim:

1. An apparatus for reducing the initial set-point error of a DC/DC converter, comprising:
   a DC/DC converter configured to provide a supply voltage to power terminals of a load, said converter having a trim input for adjusting the voltage level of the supply voltage and remote sense lines coupled to the load power terminals; and
   a power supply controller having input terminals coupled to the remote sense lines and an output coupled to the trim input of the converter.

2. The apparatus of claim 1, wherein an output voltage of the power supply controller output is compared to a reference voltage in the converter to effect a change in the voltage level of the supply voltage.

3. The apparatus of claim 1, wherein a voltage sensed by the remote sense lines is compared to a precision voltage reference in the power supply controller to provide an output voltage at the output of the power supply controller.

4. The apparatus of claim 3, wherein an uncertainty in the voltage level of the precision voltage reference is less than about +/−1% of an intended reference voltage level.

5. The apparatus of claim 1, wherein the power supply controller comprises a first amplifier having inputs coupled to the input terminals of the power supply controller and an output that provides a first output voltage depending on the voltage sensed by the remote sense lines.

6. The apparatus of claim 5, wherein the power supply controller further comprises:
   a second amplifier having a first input coupled to the output of the first amplifier, a second input and an output; and
   a precision voltage reference device coupled to the second input of the second amplifier,
   wherein the output of the second amplifier is the output of the power supply controller.

7. The apparatus of claim 6, wherein an uncertainty in a voltage level provided by the precision voltage reference device is less than about +/−1% of an intended precision reference voltage level.

8. The apparatus of claim 6, wherein the output voltage of the output of the power supply controller is compared to a reference voltage in the converter to effect a change in the voltage level of the supply voltage.

9. A method of reducing the initial set-point error of a DC/DC converter that is configured to supply a voltage to a load, the method comprising:
   sensing a voltage actually applied to the load using sense lines of said DC/DC converter;
   comparing the voltage actually applied to the load to a precision voltage reference; and
   applying a trim voltage to a trim input of said DC/DC converter, said trim voltage having a voltage level depending on the difference between the voltage actually applied to the load and the precision voltage reference.

10. The method of claim 9, wherein an uncertainty in the precision voltage reference is less than about +/−1% of an intended precision reference voltage level.

11. The method of claim 9,
   further comprising using the trim voltage to control a pulse width of an alternating control signal provided by a pulse width modulator circuit of the DC/DC converter.

12. A test set-up for performing voltage supply margining tests on a device under test (DUT), comprising:
   a DC/DC converter configured to supply a voltage to power terminals of the DUT, said converter having a trim input and remote sense lines coupled to the DUT power terminals;
   a power supply controller having input terminals coupled to the remote sense lines and an output coupled to the trim input of the converter; and
   a tester coupled to the DUT operable to compare a measured response of the DUT to an expected response.

13. The test set-up of claim 12, wherein the tester compares the measured response to the expected response when the level of the voltage supplied to the power terminals of the DUT is within an acceptable supply voltage range of the DUT.

14. The test set-up of claim 12, wherein the tester compares the measured response to the expected response when the voltage level of the voltage supplied to the power terminals of the DUT is approximately equal to a margin voltage of an acceptable supply voltage range of the DUT.

15. The test set-up of claim 14, wherein the power supply controller compares a voltage sensed by the remote sense lines to a precision voltage reference and provides a voltage at the output of the power supply controller that causes the converter to supply the margin voltage to the DUT.

16. The test set-up of claim 12, wherein the power supply controller comprises:
   a first amplifier having inputs coupled to the power supply controller input terminals and an output;
   a second amplifier having a first input coupled to a signal representing the voltage sensed by the remote sense lines, a second input and an output coupled to the output of the power supply controller; and
   a precision voltage reference device coupled to the second input of the second amplifier.

17. The test set-up of claim 16, wherein the power supply controller compares the voltage sensed by the remote sense lines to a voltage provided by the precision voltage reference device and provides a voltage at the output of the power supply controller that causes the converter to supply a margin voltage of an acceptable supply voltage range of the DUT to the DUT.

18. The test set-up of claim 16, wherein the precision voltage reference device comprises a digital-to-analog converter (DAC) and the voltage provided by the precision voltage reference device is selected from at least two available precision voltage references provided by the DAC.

19. The test set-up of claim 18, wherein the selected precision voltage reference is selected by providing a digital signal to digital inputs of the DAC.

20. The test set-up of claim 19, wherein the digital signal is provided by the tester.

21. The test set-up of claim 20, wherein the power supply controller compares the voltage sensed by the remote sense lines to the selected precision voltage reference and provides a voltage at the output of the power supply controller that causes the converter to provide a margin voltage of an acceptable supply voltage range of the DUT to the DUT.

22. The test set-up of claim 16, wherein an uncertainty in a voltage level provided by the precision voltage reference device is less than about +/−1% of an intended precision reference voltage level.

23. A method of performing voltage supply margining tests on a device under test (DUT) that is receiving a voltage supplied by a DC/DC converter connected to the DUT, the method comprising:
  sensing a voltage actually applied to the DUT using sense lines of said DC/DC converter;
  comparing the voltage actually applied to the DUT to a precision voltage reference;
  applying a trim voltage to a trim input of said DC/DC converter, said trim voltage having a voltage level depending on the difference between the voltage actually applied to the DUT and the precision voltage reference; and
  comparing a measured response of the DUT to an expected response.

24. The method of claim 23, wherein the voltage level of the precision voltage reference is selected so that the voltage actually applied to the DUT is approximately equal to a margin voltage of an acceptable supply voltage range of the DUT.

25. The method of claim 24, further comprising selecting the precision voltage from at least two available precision voltage references.

26. A power supply controller for reducing the initial set-point error of a DC/DC converter having a first remote sense line coupled to a first power terminal of one or more electronic devices, trim circuitry with a trim input, and power terminals for coupling to the one or more electronic devices, said power supply controller comprising:
  a first amplifier having a first input for coupling to the first remote sense line that carries a signal representative of the output voltage supplied by the DC/DC converter and an output for coupling to the trim input of the DC/DC converter; and
  a precision voltage reference device for coupling to a second input of the first amplifier.

27. The power supply controller of claim 26, wherein:
  the DC/DC converter further comprises a second remote sense line coupled to a second power terminal of the one or more electronic devices: and
  the power supply controller further comprises a second amplifier having a first input for coupling to the first remote sense line, a second input for coupling to the second remote sense line, and an output that provides the signal representative of the output voltage supplied by the DC/DC converter for coupling to the first input of the first amplifier in place of the first remote sense line.

28. The power supply controller of claim 26, wherein an uncertainty in a voltage level provided by the precision voltage reference device is less than about +/−1% of an intended precision reference voltage level.

29. A test set-up for performing voltage supply margining tests on a device under test (DUT) including circuitry for reducing the initial set-point error of a DC/DC converter, said test set-up comprising:
  an amplifier having a first input configured to receive a signal representative of the output voltage supplied by the DC/DC converter at the DUT and an output coupled to a trim input of the DC/DC converter;
  a precision voltage reference device coupled to a second input of the amplifier; and
  a tester coupled to the DUT operable to compare a measured response of the DUT to an expected response.

30. The test set-up of claim 29, further comprising a second amplifier having inputs for coupling to remote sense lines of the DC/DC converter and an output that provides the signal representative of the output voltage supplied by the DC/DC converter.

31. The test set-up of claim 29, wherein an uncertainty in a voltage level provided by the precision voltage reference device is less than about +/−1% of an intended precision reference voltage level.

32. An apparatus for reducing the initial set-point error of a DC/DC converter that is configured to supply a voltage to a load, the apparatus comprising:
  means for sensing a voltage actually applied to the load using sense lines of the DC/DC converter;
  means for comparing the voltage actually applied to the load to a precision voltage reference; and
  means for applying a trim voltage to a trim input of the DC/DC converter, the trim voltage having a voltage level depending on the difference between the voltage actually applied to the load and the precision voltage reference.

33. The apparatus of claim 32, wherein an uncertainty in the precision voltage reference is less than about +/−1% of an intended precision reference voltage level.

34. The apparatus of claim 32, further comprising means for using the trim voltage to control a pulse width of an alternating control signal provided by a pulse width modulator circuit of the DC/DC converter.

35. An apparatus for performing voltage supply margining tests on a device under test (DUT) that is receiving a voltage supplied by a DC/DC converter connected to the DUT, the apparatus comprising:
  means for sensing a voltage actually applied to the DUT using sense lines of the DC/DC converter;
  means for comparing the voltage actually applied to the DUT to a precision voltage reference;
  means for applying a trim voltage to a trim input of the DC/DC converter, the trim voltage having a voltage level depending on the difference between the voltage actually applied to the DUT and the precision voltage reference; and
  means for comparing a measured response of the DUT to an expected response.

36. The apparatus of claim 35, wherein the voltage level of the precision voltage reference is selected so that the voltage actually applied to the DUT is approximately equal to a margin voltage of an acceptable supply voltage range of the DUT.

37. The apparatus of claim 36, further comprising means for selecting the precision voltage from at least two available precision voltage references.

* * * * *

UNITED STATES PATENT AND TRADEMARK OFFICE
CERTIFICATE OF CORRECTION

PATENT NO. : 6,774,612 B1
DATED : August 10, 2004
INVENTOR(S) : Ballenger et al.

It is certified that error appears in the above-identified patent and that said Letters Patent is hereby corrected as shown below:

Column 3,
Line 54, replace "supply-tolerance" with -- supply tolerance --.

Column 7,
Line 16, after "(as shown in Fig" replace "41" with -- 4) --.

Column 11,
Line 65, after "one or more electronic" replace "devices:" with -- devices; --.

Signed and Sealed this

Twenty-third Day of August, 2005

JON W. DUDAS
*Director of the United States Patent and Trademark Office*